United States Patent [19]

Beatty

[11] 3,761,599

[45] Sept. 25, 1973

[54] MEANS FOR REDUCING EDDY CURRENT HEATING OF A TANK IN ELECTRIC APPARATUS

[75] Inventor: John W. Beatty, Newtown Square, Pa.

[73] Assignee: General Electric Company, Philadelphia, Pa.

[22] Filed: Sept. 5, 1972

[21] Appl. No.: 286,470

[52] U.S. Cl............ 174/15 R, 165/105, 174/35 CE, 200/150 J
[51] Int. Cl. ...................... F28d 15/00, H01f 27/28
[58] Field of Search............ 174/15 R, 16 R, 35 CE; 165/105; 200/150 J

[56] References Cited
UNITED STATES PATENTS
3,711,622   1/1973   Deno .............................. 174/35 CE
3,214,544  10/1965   Leeds ......................... 174/15 BH X
3,563,309   2/1971   Basiulis .............................. 165/105
3,595,304   7/1971   McHugh ............................. 165/105

Primary Examiner—Bernard A. Gilheany
Assistant Examiner—A. T. Grimley
Attorney—J. Wesley Haubner et al.

[57] ABSTRACT

Eddy-current heating of a tank wall is reduced by providing the tank wall with shorting members forming a secondary loop around a portion of the tank wall. One of the shorting members is located outside the tank and is a tube forming a portion of a heat pipe. This heat pipe also comprises a reservoir communicating with the tube and containing liquid refrigerant that is in good heat-exchange relationship with a portion of the tank wall.

8 Claims, 6 Drawing Figures

MEANS FOR REDUCING EDDY CURRENT HEATING OF A TANK IN ELECTRIC APPARATUS

BACKGROUND

This invention relates to electrical apparatus comprising a steel tank and a high current primary conductor extending through the tank and, more particularly, relates to means for reducing the extent to which said tank is heated by eddy currents induced therein by current through the primary conductor.

The following references are of interest with respect to the reduction of eddy current heating: U.S. Pat. No. 2,933,551–Kramer; and British patents 265,966 (1927) and 416,564 (1932). Also of interest with respect to the present application is copending application Ser. No. 231,519–Deno, filed Mar. 3, 1972 now U.S. Pat. No. 3,711,622, and assigned to the assignee of the present invention; U.S. Pat. No. 3,598,178–Staub; and U.S. Pat. No. 3,662,137–Cleaveland.

One heretofore-used way of reducing eddy-current heating of such a tank is to provide the tank with inner and outer shorting bars of high conductivity metal which are connected together at their ends to form a loop around a portion of the tank wall. Current induced in this loop by current in the primary conductor develops a magnetic field in the tank wall that tends to cancel the magnetic field produced by the primary conductor current.

Unfortunately, prior arrangements embodying this approach have not reduced tank heating to the extent required for certain high current applications. Two regions of the tank where eddy current heating is especially intense are the regions containing the usual tank end rings that surround the primary conductor where it passes through the tank wall. These end rings, typically of magnetic steel, usually surround the primary conductor more closely than the rest of the tank and are therefore subject to the greatest eddy-current heating.

SUMMARY

The general object of my invention is to provide means for reducing eddy-current heating of the tank which is especially effective in limiting the temperature rise of the aforementioned end rings.

Another object is to provide a shorting-member type of eddy-current-heating reducing means in which there are incorporated heat pipes for subjecting the tank end rings to vigorous cooling action.

Another object is to provide a heat-pipe type of cooling arrangement for the end rings in which a portion of the heat pipe serves not only for cooling purposes but also as part of a shorting member for reducing eddy-current heating.

In carrying out my invention in one form, I provide, in combination with the above-described tank, a pair of shorting members, one located outside and the other located inside a wall portion of the tank. These shorting members extend generally longitudinally of the primary conductor and are electrically connected together at their opposite ends to form a secondary loop disposed about the tank wall portion. Means defining a generally annular reservoir surrounds the primary conductor and contains liquid refrigerant that is in good heat-exchange relationship with a tank end-ring. This refrigerant vaporizes in response to heating of the end ring by eddy currents induced therein by current in the primary conductor. The outer one of the shorting members is a tube communicating with said reservoir and receiving vapors from the refrigerant as it vaporizes. The tube is normally in a lower temperature region than the reservoir when the apparatus is operating, whereby the vapors contained in the tube condense therein, following which they are returned from the tube to the reservoir.

BRIEF DESCRIPTION OF THE DRAWINGS

For a better understanding of the invention, reference may be had to the following description taken in conjunction with the accompanying drawing, wherein.

DETAILED DESCRIPTION OF PREFERRED EMBODIMENTS

Figure 1:
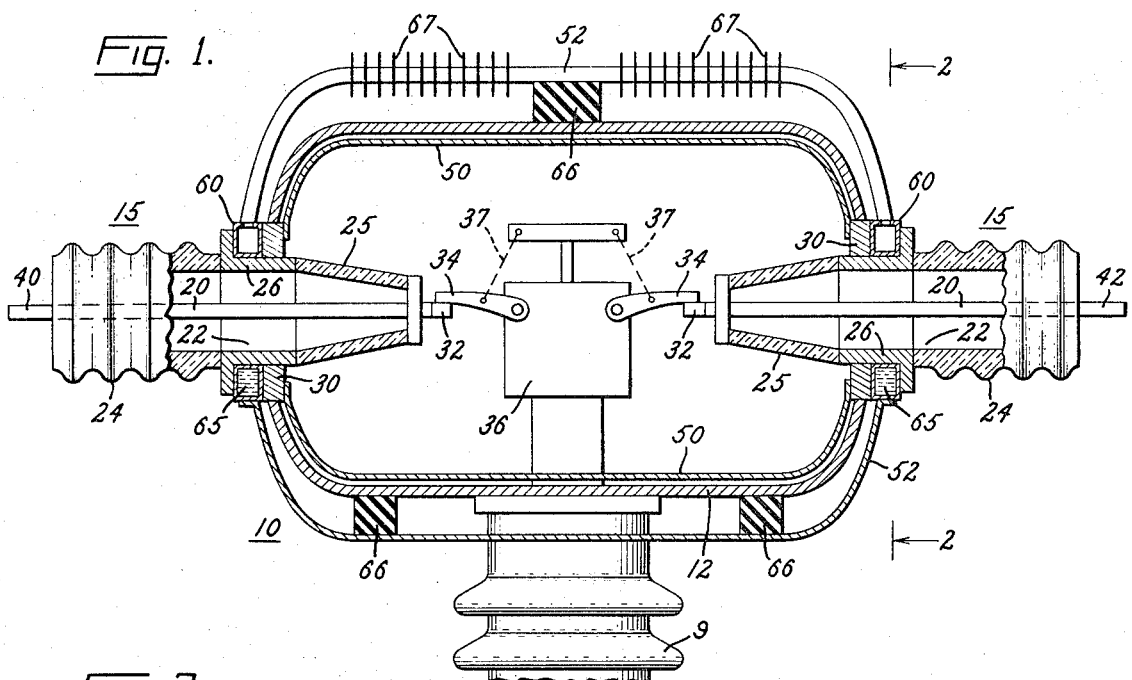
FIG. 1 is a sectional view through a high voltage electric circuit breaker embodying one form of the invention.

Referring now to FIG. 1, there is shown an electric circuit breaker 10 of the high-voltage gas-blast type, such as shown, for example, in U.S. Pat. No. 3,009,983–Oppel, assigned to the assignee of the present invention. This circuit breaker comprises an insulating support column 9 and, atop the column, a cylindrical tank 12 of a suitable low-cost metal such as mild steel. Tank 12 contains compressed gas at a pressure of several hundred p.s.i. At its opposite ends, tank 12 has end walls containing centrally disposed openings through which high-voltage lead-in bushings 15 extend.

Each of these lead-in bushings comprises a centrally disposed conductive stud 20 and a tubular insulating housing 22 surrounding stud 20. Insulating housing 22 comprises a pair of tubular shells 24 and 25 of insulating material and a tubular intermediate portion 26 of metal, preferably aluminum, disposed between the insulating shells. The parts 24, 25 and 26 of housing 22 are clamped together in a conventional manner, such as shown, for example, in the aforesaid Oppel patent.

Figure 3:
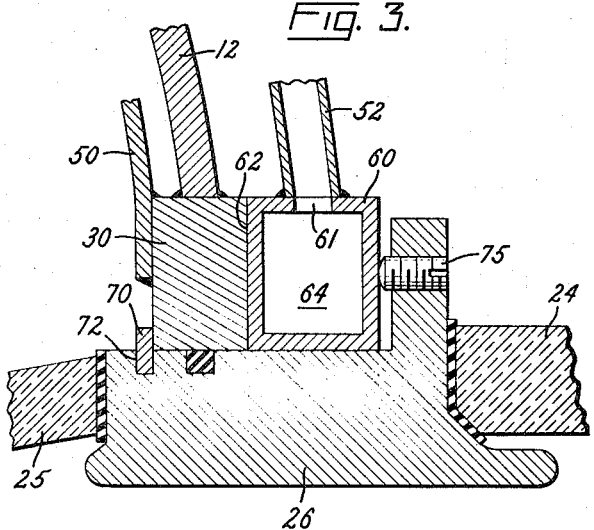
FIG. 3 is an enlarged sectional view of a portion of FIG. 1.

Surrounding each lead-in bushing and forming an integral part of tank 12 is a metal end ring 30, also preferably of mild steel. The intermediate portion 26 of the bushing fits within this end ring 30 and is suitably attached thereto, as by bolting or by the fastening means shown in the aforesaid Oppel patent. This latter fastening means, which is better shown in the enlarged view of FIG. 3, comprises a split locking ring 70 fitting in an annular groove 72 in the outer periphery of bushing part 26 and abutting against the inner face of the end ring 30. Suitable jackscrews 75 threaded in a flange of part 26 hold the locking ring 70 against the inner face of end ring 30. The gas pressure within the tank 12 also acts to hold the locking ring 70 against end ring 30.

As shown schematically in FIG. 1, disposed within tank 12 are two pairs of separable contacts connected in series-circuit relationship between the inner ends of studs 20. Each pair of contacts comprises a stationary contact 32 mounted on the inner end of the associated stud and a movable contact 34 pivotally mounted on a centrally disposed metal housing 36 which is fixed to tank 12. A suitable operating mechanism (not shown) within the housing 32 simultaneously actuates the movable contacts 34 in one direction to open the circuit breaker and simultaneously returns the movable contacts to their illustrated position to close the circuit breaker. The operating mechanism and the movable contacts are interconnected by a mechanical linkage schematically shown at 37.

When the circuit breaker is closed as shown, current flows therethrough between its two terminals 40 and 42 via one stud 20, one set of contacts 32, 34, mechanism housing 36, the other set of contacts 32, 34, and the other stud 20. This current path is referred to herein as the primary conductor and the current therethrough as the primary conductor current.

In certain circuit breakers this primary conductor current may be many thousands of amperes in magnitude, even on a continuous basis. The magnetic field produced by this high primary conductor current induces eddy currents in the steel tank 12 which tend to overheat the tank.

For reducing this eddy-current heating of the tank wall, there are provided a plurality of pairs of shorting members 50 and 52, the two members 50, 52 of each pair being connected together at their opposite ends to form a loop around a portion of the tank wall. These shorting members, which extend generally longitudinally of the primary conductor, are of a high conductivity metal, such as copper, thus assuring that the loop has a relatively low resistance.

Adjacent ends of the shorting members 50 and 52 of a given loop are electrically connected together through the end ring 30 and a soon-to-be-described annular metallic reservoir member 60, preferably of copper. The annular reservoir member 60 has an inner side face 62 that is clamped in high pressure engagement against the outer side face of the end ring 30 by the jackscrews 75. The mating surfaces of the end ring 30 and the reservoir member 60 are of a planar configuration and are preferably silver plated so as to impart a low thermal and electrical resistance to the interface therebetween.

Figure 2:
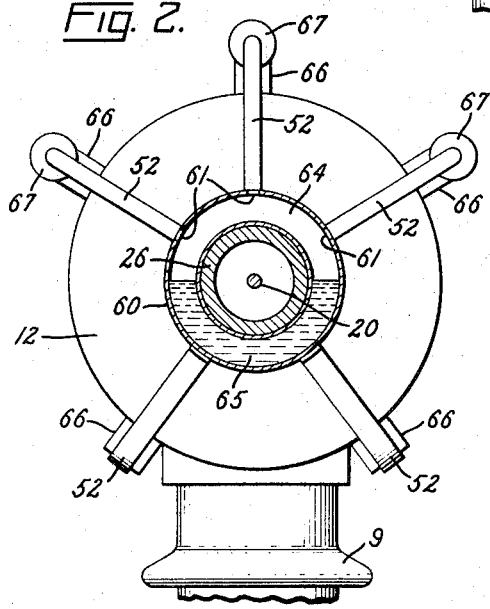
FIG. 2 is a sectional view along the line 2—2 of FIG. 1.

When a high conductivity loop such as 50, 52, 30, 60 is present around the tank wall, a secondary current is induced in the loop which develops a magnetic field in the tank wall tending to cancel out the magnetic field developed by current through the primary conductor. The extent of this cancellation is increased by providing a plurality of such loops uniformly distributed about the tank periphery, and I provide such a plurality of uniformly distributed loops, as best seen in FIG. 2; but even with this plurality of such uniformly distributed loops present, cancellation of the magnetic field in the tank wall is still incomplete, and objectionable eddy current heating occurs when the primary current is high.

Figure 4:
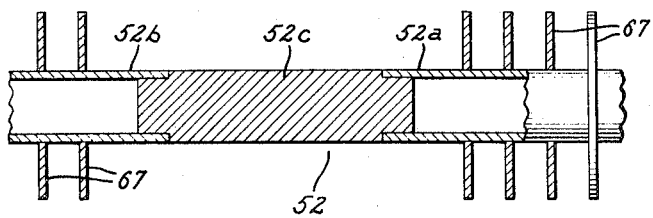
FIG. 4 is an enlarged sectional view of another portion of FIG. 1.

To limit the extent of such eddy-current heating, I construct certain of the shorting members so that they can act as heat pipes serving to extract heat from the end rings 30 of the tank. More specifically, I construct the three outer shorting members 52 that are disposed about the upper portion of tank 12 (FIG. 2) as tubes which communicate with each of the reservoirs 60 through ports 61 located at angularly spaced points about the periphery of each reservoir member. In a preferred form of the invention, each tubular member 52 is constructed of two tubular sections 52a and 52b which are joined together near the mid region of the tubular member by a plug portion 52c that is suitably brazed at its opposite ends to the tubular sections 52a and 52b, as is shown in detail in FIG. 4. Thus, each of these tubular members 52, while electrically continuous, is divided into two separate tubular sections having closed ends and isolated from each other by plug portion 52c.

Each of the annular reservoir members 60 is a hollow member that contains an annular reservoir 64. Disposed within each reservoir 64 is a normally liquid refrigerant 65, such as Freon 113 (i.e., trichlorotrifluorethane), which will be vaporized by heat transferred to the reservoir member from the juxtaposed end ring 30 when high currents flow through the primary conductor 20. When the refrigerant boils and a portion vaporizes in response to such heat, the resulting vapors pass into the tubular members 52 communicating with the space above the liquid level of the refrigerant. The tubular members 52, being outside the tank 12 and completely exposed to the surrounding ambient, are in a relatively cool region. The vapors within the tubular members 52 therefore condense on the relatively cool walls of the tubular members, and the liquid condensate thereafter returns by gravity to the reservoir 64 where it is again available for vaporization. To accelerate heat transfer from the walls of each tubular member 52 to the surrounding ambient, heat-radiating fins 67, preferably of a high conductivity material such as copper, are suitably joined to the tubular member on its outside surface. These fins, in combination with the high conductivity of the tube material, serve to maintain the tubular member 52 relatively cool so that it can continue to act indefinitely as an effective condenser for the vapors. It will be apparent that the parts 52, 60, 64, 65 (functioning as above-described) are acting as a heat pipe, extracting heat from the end rings 30 and transferring it to the tubular portions 52. It will be further apparent that the parts 60, 52, act in a dual capacity, not only as key elements of a heat pipe, but also as important components of the shorting-bar arrangement described hereinabove.

While the intermediate member 26 of bushing 15 is even closer than the end ring 30 to the primary conductor 20, it will be subject to far less heating than the end ring because it is of nonmagnetic material, preferably aluminum. To the extent that member 26 is heated, it will also be cooled by the action of heat pipe 60, 52, 64, 65.

While the specific configuration of the tubular members 52 is not crucial, it is highly desirable that the members be spaced from the wall of tank 12 so as to be, in effect, thermally uncoupled or insulated from the tank wall. Most of the heat released from the shorting member 52 can therefore be transferred to the surrounding air without appreciably heating the tank.

For providing mechanical support for each of the shorting members 52, spacers 66 are suitably attached to the tank wall and the shorting members 52 in positions between the two parts 12 and 52. Spacers 66 are preferably, though not necessarily, of a thermal insulating material.

The shorting members 52 that are disposed about the lower portion of the tank exterior are preferably solid bars rather than being tubular as in the case of the upper shorting members. Since these lower shorting members attach to the annular reservoir member 60 below the normal liquid level of the refrigerant 65, they would be filled with liquid if they were of the same tubular construction as the upper members 52 and could therefore not act as vapor condensers. This being the case, and for reasons of economics, I make these lower shorting members of a simple and inexpensive bar construction, having no passages therein communicating with the reservoirs.

Figure 5:
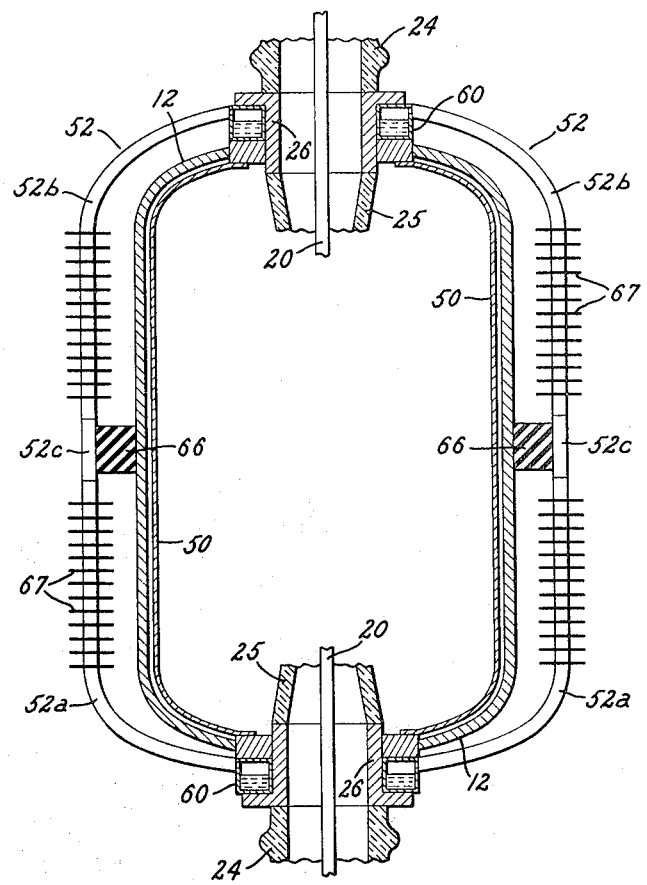
FIG. 5 is a sectional view of a modified form of the invention.

Though described above as being applied to a horizontally extending tank, my invention is also applicable to a vertically extending tank such as shown in FIG. 5. In FIG. 5, each of the shorting members 52 comprises two tubular sections 52a and 52b joined together by a centrally disposed plug section 52c. Two reservoir members 60 are respectively disposed in contact with the upper and lower end rings 30. Referring to lower reservoir member 60, the lower tubular section 52a of each tubular member 52 communicates with its reservoir 64 adjacent the top of this reservoir 64. Referring to upper reservoir member 60, the upper tubular section 52b of each tubular member 52 communicates with its reservoir 64 adjacent the top of its reservoir 64. Thus, in each reservoir all the ports that connect the reservoir to the associated tubular members are disposed above the liquid level of the refrigerant 65 therein. Thus, each of the tubular members 52a or 52b can receive vapors from its associated reservoir when the refrigerant in the reservoir vaporizes and can therefore act as the condenser element of the heat pipe.

Figure 6:
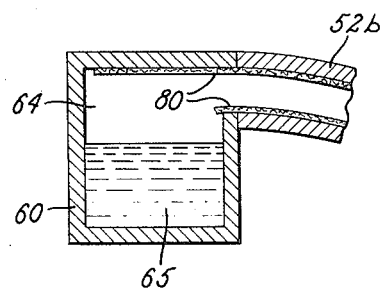
FIG. 6 is an enlarged sectional view of a portion of FIG. 5.

In the lower tubular section 52a the condensate will return by gravity to its associated reservoir 64, but not in the upper tubular section 52b. To return the condensate in the upper tubular sections to their reservoir 64, I employ suitable wicks in each tubular section 52b. These wicks return the condensate by capillary action to the upper reservoir 64 against the force of gravity. FIG. 6 shows such wicking at 80 disposed partially within tubular section 52b and partially within reservoir 64 so that it is able to return the liquid condensate to the reservoir from the tubular section. Wicking 80 extends along the length of the tubular section 52b from the position of FIG. 1 to its bottom.

While I have shown and described particular embodiments of my invention, it will be obvious to those skilled in the art that various changes and modifications may be made without departing from my invention in its broader aspects; and I, therefore, intend herein to cover all such changes and modifications as fall within the true spirit and scope of my invention.

What I claim as new and desire to secure by Letters Patent of the United States is:

1. Electric apparatus comprising:
   a. a tank having a generally cylindrical wall portion principally of steel,
   b. a high current primary conductor extending through the tank and surrounded by said generally cylindrical wall portion,
   c. said tank further comprising an end ring principally of steel joined to said cylindrical wall portion and surrounding said primary conductor where the primary conductor enters said tank,
   d. a pair of shorting members, one located outside said cylindrical wall portion and the other located inside said cylindrical wall portion,
   e. said shorting members extending generally longitudinally of said conductor and electrically connected together at their opposite ends to form a secondary loop that is disposed around said generally cylindrical wall portion of the tank.
   f. said shorting members being of a material having a higher electrical conductivity than the principal material of said tank wall portion,
   g. means defining a generally annular reservoir surrounding said primary conductor and containing liquid refrigerant that is in good heat exchange relationship with said end ring and that vaporizes in response to heating of said end ring by eddy currents induced therein by current in said primary conductor,
   h. the outer one of said shorting members being a tube that communicates with said reservoir and receives vapors from said refrigerant as it vaporizes,
   i. said tube normally being in a lower temperature region than said reservoir when said apparatus is operating whereby the vapors contained in said tube condense therein,
   j. and means for returning said condensed vapors from said tube to said reservoir.

2. The electric apparatus of claim 1 in which:
   a. said tank has two opposite ends and comprises at one end said end ring of (b) claim 1 and comprises at its opposite end another end ring surrounding said primary conductor where it leaves said tank,
   b. means defining another generally annular reservoir surrounds said primary conductor and contains liquid refrigerant that is in good heat-exchange relationship with said other end ring and that vaporizes in response to heating of said other end ring by eddy currents induced therein by current in said primary conductor,
   c. said tubular shorting member comprises two tubular sections that are electrically connected in series in said secondary loop but have their interiors hydraulically isolated from each other, the interior of one of said tubular sections being in communication with said one reservoir to receive vapors from said one reservoir and to return condensate thereto, and the interior of the other of said tubular sections being in communication with the other of said reservoirs to receive vapors from said other reservoir and to return condensate thereto.

3. In electrical apparatus as defined in claim 1,
   a. an additional shorting member of tubular form located outside said tank and angularly spaced about the tank periphery from said shorting member,
   b. means for electrically connecting the ends of said additional shorting member in another secondary loop disposed around said cylindrical tank wall portion,
   c. said additional tubular shorting member communicating with said reservoir and receiving vapors from said refrigerant as it vaporizes,
   d. said additional shorting member also being in a lower temperature region than said reservoir when said apparatus is operating whereby the vapors contained in said additional tubular shorting member condense, and
   e. means for returning the condensate from said additional tubular shorting member to said reservoir.

4. The electrical apparatus of claim 3 in which said tubular shorting members communicate with said reservoir through ports that are located above the normal level of liquid refrigerant in said reservoir.

5. Electrical apparatus as defined in claim 3 in which:
a. said tubular shorting members are disposed about the exterior of the upper portion of said tank,
b. an additional shorting member of bar form is disposed about the exterior of the lower portion of said tank,
c. said latter shorting member has no passages therein communicating with said reservoir,
d. and means is provided connecting said latter shorting member in another secondary loop disposed about said generally cylindrical wall portion of the tank.

6. The electrical apparatus of claim 2 in which:
a. said cylindrical tank wall portion extends generally vertically and said end rings are disposed at different levels,
b. each tubular section communicates with its associated reservoir through a port located near the top of the reservoir above the normal level of the liquid refrigerant in said reservoir.

7. The electrical apparatus of claim 2 in which:
a. said cylindrical tank wall portion extends generally vertically and said end rings are disposed at different levels,
b. each tubular section communicates with its associated reservoir through a port located near the top of the reservoir above the normal level of the liquid refrigerant in said reservoir,
c. one of said tubular sections in extending away from its associated reservoir extends downwardly, and
d. wicking is provided in said latter tubular section for returning condensate collecting therein to said associated reservoir against gravity forces.

8. The electrical apparatus of claim 1 in which said outer shorting member is spaced from said cylindrical wall portion along at least a portion of the length of said outer shorting member to provide thermal insulation between said outer shorting member and said cylindrical wall portion.

* * * * *